Patented July 20, 1926.

1,592,853

UNITED STATES PATENT OFFICE.

HARRY A. HOFFMAN AND JOHN B. DICKSON, OF AKRON, OHIO, ASSIGNORS TO THE B. F. GOODRICH COMPANY, OF NEW YORK, N. Y., A CORPORATION OF NEW YORK.

METHOD FOR CONTROLLING ADHESION OF RUBBER.

No Drawing. Application filed October 30, 1922. Serial No. 598,005.

This invention relates to the rubber working art, particularly to the matter of preventing undue adhesion of masses of unvulcanized rubber or rubber compositions to each other or to other objects such as forms or molds used in shaping such masses.

Heretofore it has been common practice to dust the stock with a material such as comminuted soapstone, starch, mica or graphite, or to treat it with an aqueous suspension of such material. A disadvantage of such practice is that the materials heretofore used, so far as we are aware, remain embedded in the surface of the rubber after vulcanization, sometimes discoloring the rubber or rendering its surface dull. A further disadvantage is that they accumulate in the molds, forming a scale and roughening the surface, and another disadvantage is that they hinder or prevent the proper amalgamating or welding together of adjacent masses of stock which are intended to coalesce during vulcanization.

Our object is to provide an improved method and an improved adhesion-preventing substance whereby one or more of these disadvantages may be substantially overcome.

We have found that this may be attained by using, either in the form of a dusting powder or in suspension, a rubber-soluble substance adapted readily to form a thin layer upon the rubber and so to prevent adhesion before vulcanization, but to be absorbed by the rubber during vulcanization. Certain heavy-metal salts of the higher fatty acids, such, for example, as zinc stearate, or metallic salts of aromatic or hydroaromatic acids, such, for example, as zinc benzoate or zinc resinate, are suitable substances for this purpose, since in the small amounts required they are sufficiently soluble in rubber, and at such rate, as to be entirely absorbed by the rubber during vulcanization, leaving no exposed or embedded material at the surface of the finished article.

In some cases we prefer to use the material dry, simply dusting it upon the surface of the rubber mass. In other cases it is preferable to apply the material in suspension, as a paint. We have found that a proper suspension may be prepared by mixing one part by weight of zinc stearate with one part of alcohol, or similar substance adapted to wet the stearate and at the same time be soluble in water, to produce a clay-like paste, and then gradually adding twelve parts of water, stirring between successive additions of water. A stable suspension may thus be produced, and such suspension is applied as a paint to the surface of the stock.

When the adhesion-preventing substance is to be applied in a suspension, it is preferably suspended in a liquid which is not a rubber solvent.

In some special cases it may be advantageous to restore the tacky condition after dusting and before curing. Under these conditions we prefer to use zinc-palmitate as the adhesion-preventing substance, since it may be gelatinized, as by treating it with benzol. After applying the palmitate the tackiness of the rubber may be restored by applying benzol thereto, as by means of a swab. The zinc palmitate, being soluble in rubber, will not prevent the coalescence of adjacent rubber masses during vulcanization although it be thus gelatinized by the benzol.

Various modifications may be resorted to within the scope of our invention, and we do not wholly limit our claims to the specific substances or the exact procedure herein described.

We claim:

1. A process for controlling the adhesion of rubber due to surface tack which comprises applying to the surface of the rubber a coating of an organic compound capable of preventing adhesion of rubber at normal temperatures and substantially soluble in rubber at vulcanization temperatures so as to leave the surface of the rubber substantially free of said coating agent after vulcanization.

2. The method of controlling the adhesion of rubber which comprises applying to the surface of the rubber a heavy-metal salt of an organic acid, said salt being soluble in the rubber.

3. A process for controlling the adhesion of rubber due to surface tack which comprises applying to the surface of the rubber a coating of an organic compound which is solid and capable of preventing adhesion of rubber at normal temperatures and which is fusible and substantially soluble in rubber at vulcanization temperatures.

4. The method of controlling the adhesion of rubber which comprises applying to the surface of the rubber a suspension of a heavy-metal salt of an organic acid which is soluble in rubber.

5. The method of controlling the adhesion of rubber which comprises applying to the surface of the rubber a heavy-metal salt of a higher fatty acid.

6. The method of controlling the adhesion of rubber which comprises applying to the surface of the rubber a suspension of a heavy metal salt of a higher fatty acid.

7. The method of controlling the adhesion of rubber which comprises applying zinc stearate to the surface of the rubber.

8. The method of controlling the adhesion of rubber which comprises applying zinc stearate in suspension to the surface of the rubber.

9. The method of controlling the adhesion of rubber which comprises applying to the surface of the rubber a rubber-soluble heavy metal salt of an organic acid suspended in a mixture of alcohol and water.

10. The method of controlling the adhesion of rubber which comprises applying to the surfaces of the rubber zinc stearate suspended in a mixture of alcohol and water.

In witness whereof we have hereunto set our hands this 26 day of October, 1922.

HARRY A. HOFFMAN.
JOHN B. DICKSON.